United States Patent
Brown et al.

(10) Patent No.: US 11,694,542 B2
(45) Date of Patent: Jul. 4, 2023

(54) VEHICLE OPERATION

(71) Applicant: Ford Global Technologies, LLC, Dearborn, MI (US)

(72) Inventors: Patrick Brown, Sewickley, PA (US); Thomas Lee Miller, Ann Arbor, MI (US); Justin Bauer, Plymouth, MI (US); Walter L. Stephens, Jr., Farmington Hills, MI (US); Gary Jablonski, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 456 days.

(21) Appl. No.: 16/992,263

(22) Filed: Aug. 13, 2020

(65) Prior Publication Data

US 2022/0048471 A1    Feb. 17, 2022

(51) Int. Cl.
| | |
|---|---|
| *B60R 25/30* | (2013.01) |
| *B60R 25/25* | (2013.01) |
| *G08G 1/01* | (2006.01) |
| *B60K 35/00* | (2006.01) |
| *G01C 21/34* | (2006.01) |

(52) U.S. Cl.
CPC ......... *G08G 1/0104* (2013.01); *B60R 25/257* (2013.01); *B60K 2370/152* (2019.05)

(58) Field of Classification Search
CPC ............... G08G 1/0104; B60R 25/257; B60K 2370/152
See application file for complete search history.

(56) References Cited

U.S. PATENT DOCUMENTS

| | | |
|---|---|---|
| 6,271,745 B1 | 8/2001 | Anzai et al. |
| 6,665,600 B2 | 12/2003 | Miller et al. |
| 6,759,943 B2 | 7/2004 | Lucy et al. |
| 7,068,189 B2 * | 6/2006 | Brescia .............. H04W 4/029 340/988 |

(Continued)

FOREIGN PATENT DOCUMENTS

| | | | | |
|---|---|---|---|---|
| WO | WO-2018169534 A1 * | 9/2018 | ......... | G01C 21/3691 |
| WO | WO-2021099849 A1 * | 5/2021 | ........... | G08G 1/0112 |

OTHER PUBLICATIONS

Rajeshwari, J., et al., "Three Phase Security System for Vehicles Using Face Recognition on Distributed Systems," Information Systems Design and Intelligent Applications, Advances in Intelligent Systems and Computing 435, 2016, 9 pages.

*Primary Examiner* — Chico A Foxx
(74) *Attorney, Agent, or Firm* — Frank Lollo; Bejin Bieneman PLC

(57) ABSTRACT

A computer includes a processor and a memory, the memory storing instructions executable by the processor to collect biometric data of a vehicle user, identify a set of user-specific data from one or more stored sets of user-specific data based on the biometric data, and receive a request for a stored location. When the biometric data of the vehicle user match the stored biometric data, the instructions include instructions to display the requested location. When the biometric data of the vehicle user do not match the stored biometric data, the instructions include instructions to identify an offset location based on the requested location and a population density of the requested location and display the offset location.

20 Claims, 6 Drawing Sheets

(56) References Cited

U.S. PATENT DOCUMENTS

| | | | |
|---|---|---|---|
| 8,150,617 B2* | 4/2012 | Manber | H04L 67/52 |
| | | | 701/484 |
| 8,531,317 B2* | 9/2013 | Horstemeyer | G06Q 20/382 |
| | | | 340/988 |
| 8,630,800 B1* | 1/2014 | Connolly | G01C 21/343 |
| | | | 340/995.14 |
| 10,607,296 B2 | 3/2020 | Katta et al. | |
| 11,127,040 B2* | 9/2021 | Wan | G06F 16/29 |
| 11,287,323 B2* | 3/2022 | Kim | H01L 22/12 |
| 2011/0098915 A1* | 4/2011 | Disatnik | G01C 21/3415 |
| | | | 701/533 |
| 2013/0073192 A1* | 3/2013 | Hota | G08G 1/04 |
| | | | 701/118 |
| 2013/0325320 A1* | 12/2013 | Dimitriadis | G01C 21/3605 |
| | | | 701/414 |
| 2014/0309879 A1* | 10/2014 | Ricci | G08G 1/096741 |
| | | | 701/36 |
| 2014/0372021 A1* | 12/2014 | Dimitriadis | G01C 21/3415 |
| | | | 701/414 |
| 2015/0142300 A1* | 5/2015 | Tsirkin | G01C 21/3415 |
| | | | 701/410 |
| 2015/0219468 A1* | 8/2015 | Ziezold | G01C 21/3415 |
| | | | 701/410 |
| 2016/0298974 A1* | 10/2016 | Newlin | G08G 1/0141 |
| 2016/0373473 A1* | 12/2016 | Truong | G01C 21/28 |
| 2017/0069208 A1* | 3/2017 | Nair | G01C 21/3602 |
| 2017/0302680 A1 | 10/2017 | Biswas et al. | |
| 2017/0352215 A1 | 12/2017 | Miawand et al. | |
| 2018/0094943 A1* | 4/2018 | Grochocki, Jr. | G01C 21/3492 |
| 2018/0097804 A1 | 4/2018 | Boehm | |
| 2018/0181359 A1* | 6/2018 | Monroe | B60Q 3/10 |
| 2018/0216950 A1* | 8/2018 | Seagraves | G01C 21/3484 |
| 2020/0026421 A1* | 1/2020 | Rosa | G06F 3/04883 |
| 2021/0232642 A1* | 7/2021 | Ricci | G06F 9/451 |
| 2021/0312796 A1* | 10/2021 | Lull | G06V 20/56 |
| 2021/0374623 A1* | 12/2021 | Dyer | G01C 21/343 |

\* cited by examiner

VEHICLE OPERATION

BACKGROUND

Various displays can be provided to display user data, e.g., for interacting with a web site, navigating, etc. Displays, for example, a display mounted in a vehicle, may be mounted for visibility to any user who enters the vehicle, and/or data can be provided to a user display based on an operation that a computer, e.g., a computer in a vehicle, is requested and/or attempting to perform. The data can be available to all users of the vehicle.

DETAILED DESCRIPTION

Figure 1:
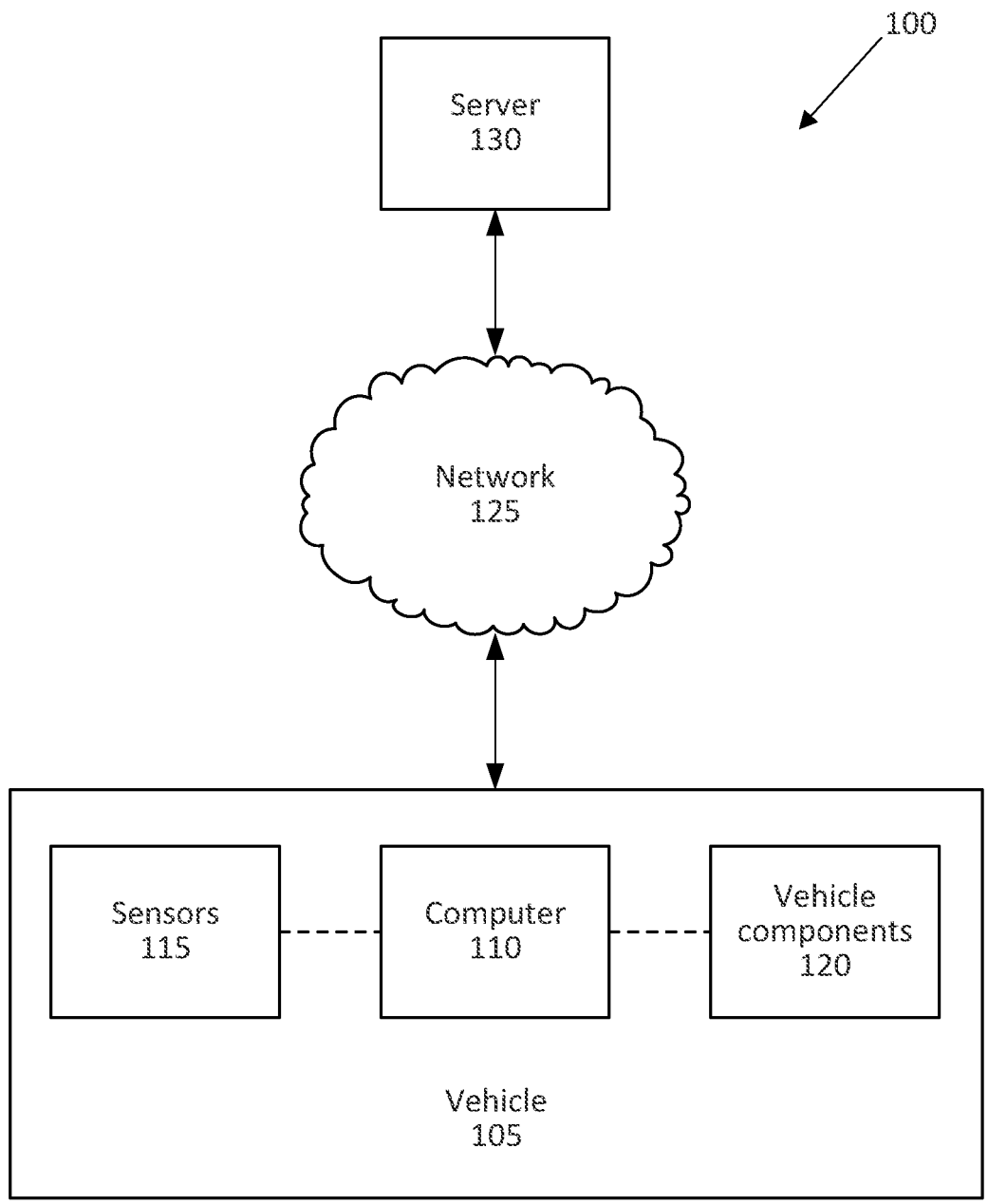
FIG. 1 is a diagram of an example system for operating a vehicle.

A system includes computer including a processor and a memory, the memory storing instructions executable by the processor to identify a set of user-specific data from one or more stored sets of user-specific data based on identifying a user, receive a request for a stored location, and based on identifying the user, identify an offset location based on the requested location and a population density of the requested location, and display the offset location.

The instructions can further include instructions to identify an intersection of two or more roads within a distance threshold of the requested location as the offset location.

The instructions can further include instructions to identify a plurality of intersections within the distance threshold of the requested location, to identify a traffic capacity of each of the plurality of intersections, and to identify a one of the plurality of intersections having a highest traffic capacity as the offset location, wherein the traffic capacity includes at least one of a number of roadway lane at the intersection, a posted speed limit at the intersection, or an average number of vehicles traveling through the intersection for a predetermined period of time.

The instructions can further include instructions to identify the intersection when the population density is above a first threshold.

The instructions can further include instructions to identify first and second radii from the requested location, to identify an annulus defined by the first and second radii having an origin at the requested location, and to randomly select a location within the annulus as the offset location.

The instructions can further include instructions to identify a plurality of locations within the annulus that are on a roadway and to randomly select one of the plurality of locations as the offset location.

The instructions can further include instructions to identify the first and second radii when the population density is below a second threshold.

The instructions can further include instructions to identify a specified geographical area in which the requested location is located and to identify a centroid of the specified geographical area as the offset location.

The specified geographical area can be a geographical area defined by a common postal code.

The instructions can further include instructions to identify the specified geographical area when the population density is below a first threshold and above a second threshold.

The instructions can further include instructions to identify the user based on biometric data collected with one of a fingerprint scanner, a camera, or a microphone.

The biometric data can include at least one of a fingerprint, facial image data, or voice data.

A method includes identifying a set of user-specific data from one or more stored sets of user-specific data based on identifying a user, receiving a request for a stored location, and, based on identifying the user, identifying an offset location based on the requested location and a population density of the requested location, and displaying the offset location.

The method can further include identifying an intersection of two or more roads within a distance threshold of the requested location as the offset location.

The method can further include identifying a plurality of intersections within the distance threshold of the requested location, identifying a traffic capacity of each of the plurality of intersections, and identifying a one of the plurality of intersections having a highest traffic capacity as the offset location, wherein the traffic capacity includes at least one of a number of roadway lane at the intersection, a posted speed limit at the intersection, or an average number of vehicles traveling through the intersection for a predetermined period of time.

The method can further include identifying the intersection when the population density is above a first threshold.

The method can further include identifying first and second radii from the requested location, identifying an annulus defined by the first and second radii having an origin at the requested location, and randomly selecting a location within the annulus as the offset location.

The method can further include identifying a plurality of locations within the annulus that are on a roadway and randomly selecting one of the plurality of locations as the offset location.

The method can further include identifying the first and second radii when the population density is below a second threshold.

The method can further include identifying a specified geographical area in which the requested location is located and identifying a centroid of the specified geographical area as the offset location.

The method can further include identifying the specified geographical area when the population density is below a first threshold and above a second threshold.

The method can further include identifying the user based on biometric data collected with one of a fingerprint scanner, a camera, or a microphone.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

When a computer in a vehicle does not allow access to all data in a set of user-specific data, the computer can obfuscate at least some of the data in a display in the vehicle. That is, instead of preventing access to the information, the computer can present modified information to the user. The computer can provide finer control of data presented on the display than a conventional algorithm that suppresses or allows access to all of the data. This more detailed control is an improvement that allows for selectively controlling data to be presented and data not to be presented on a display.

Modifying the data can be performed with algorithms that are less computationally costly than encryption algorithms that would be used to protect the information in the sets of user-specific data. For example, the computer can modify stored locations in the sets of user-specific data to an offset location, i.e., a location that is based on the stored location but is not the stored location. That is, the computer can apply an algorithm to generate the offset location based on the stored location. For example, the computer can identify an intersection of roads near the stored location as the offset location. In another example, the computer can identify a center point of a specified geographic area in which the store location is located as the offset location. In yet another example, the computer can identify a random location in a specified area around the stored location as the offset location.

In addition to modifying the stored locations, the computer can modify and/or block other user-specific data. For example, the computer can prevent saving of settings for one or more components. In another example, the computer can block stored contact information such as phone numbers, email addresses, etc. In another example, the computer can prevent deletion of the user-specific data.

Identifying users that have stored sets of user-specific data allows the users to access their data, including stored locations such as a home address, a work address, and favored retail locations. Information in the stored user-specific data can be displayed, e.g., on a display that is included in a vehicle.

A computer in a vehicle can determine a level of access for a vehicle based on data collected from the user. For example, if the user has a key fob, the computer can allow a limited level of access that does not allow access to the user-specific data. In another example, if the user has a connected application on a portable device (such as a smartphone or a smartwatch), the computer can allow a greater level of access to some but not all data in the sets of user-specific data, such as access to favored locations but not a home address. In another example, if the computer confirms that biometric data collected from the user substantially matches biometric data in one of the sets of user-specific data, the computer can allow access to all information in the sets of user-specific data.

FIG. 1 illustrates an example system 100 for operating a vehicle 105. A computer 110 in the vehicle 105 is programmed to receive collected data from one or more sensors 115. For example, vehicle 105 data may include a location of the vehicle 105, data about an environment around a vehicle, data about an object outside the vehicle such as another vehicle, etc. A vehicle 105 location is typically provided in a conventional form, e.g., geo-coordinates such as latitude and longitude coordinates obtained via a navigation system that uses the Global Positioning System (GPS). Further examples of data can include measurements of vehicle 105 systems and components, e.g., a vehicle 105 velocity, a vehicle 105 trajectory, etc.

The computer 110 is generally programmed for communications on a vehicle 105 network, e.g., including a conventional vehicle 105 communications bus such as a CAN bus, LIN bus, etc., and or other wired and/or wireless technologies, e.g., Ethernet, WIFI, etc. Via the network, bus, and/or other wired or wireless mechanisms (e.g., a wired or wireless local area network in the vehicle 105), the computer 110 may transmit messages to various devices in a vehicle 105 and/or receive messages from the various devices, e.g., controllers, actuators, sensors, etc., including sensors 115. Alternatively or additionally, in cases where the computer 110 actually comprises multiple devices, the vehicle network may be used for communications between devices represented as the computer 110 in this disclosure. For example, the computer 110 can be a generic computer with a processor and memory as described above and/or may include a dedicated electronic circuit including an ASIC that is manufactured for a particular operation, e.g., an ASIC for processing sensor data and/or communicating the sensor data. In another example, computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in computer 110.

In addition, the computer 110 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The memory can be of any type, e.g., hard disk drives, solid state drives, servers, or any volatile or non-volatile media. The memory can store the collected data sent from the sensors 115. The memory can be a separate device from the computer 110, and the computer 110 can retrieve information stored by the memory via a network in the vehicle 105, e.g., over a CAN bus, a wireless network, etc. Alternatively or additionally, the memory can be part of the computer 110, e.g., as a memory of the computer 110.

Sensors 115 can include a variety of devices. For example, various controllers in a vehicle 105 may operate as sensors 115 to provide data via the vehicle 105 network or bus, e.g., data relating to vehicle speed, acceleration, location, subsystem and/or component status, etc. Further, other sensors 115 could include cameras, motion detectors, etc., i.e., sensors 115 to provide data for evaluating a position of a component, evaluating a slope of a roadway, etc. The sensors 115 could, without limitation, also include short range radar, long range radar, LIDAR, and/or ultrasonic transducers.

Collected data can include a variety of data collected in a vehicle 105. Examples of collected data are provided above, and moreover, data are generally collected using one or more sensors 115, and may additionally include data calculated therefrom in the computer 110, and/or at the server 130. In general, collected data may include any data that may be gathered by the sensors 115 and/or computed from such data.

The vehicle 105 can include a plurality of vehicle components 120. In this context, each vehicle component 120 includes one or more hardware components adapted to perform a mechanical function or operation—such as moving the vehicle 105, slowing or stopping the vehicle 105, steering the vehicle 105, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like. Components 120 can include computing devices, e.g., electronic control units (ECUs) or the like and/or computing devices such as described above with respect to the computer 110, and that likewise communicate via a vehicle 105 network.

A vehicle 105 can operate in one of a fully autonomous mode, a semiautonomous mode, or a non-autonomous mode. A fully autonomous mode is defined as one in which each of vehicle 105 propulsion (typically via a powertrain including an electric motor and/or internal combustion engine), braking, and steering are controlled by the computer 110. A semiautonomous mode is one in which at least one of vehicle 105 propulsion (typically via a powertrain including an electric motor and/or internal combustion engine), braking, and steering are controlled at least partly by the computer 110 as opposed to a human operator. In a non-autonomous mode, i.e., a manual mode, the vehicle 105 propulsion, braking, and steering are controlled by the human operator.

The system 100 can further include a network 125 connected to a server 130. The computer 110 can further be programmed to communicate with one or more remote sites such as the server 130, via the network 125, such remote site possibly including a processor and a memory. The network 125 represents one or more mechanisms by which a vehicle computer 110 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
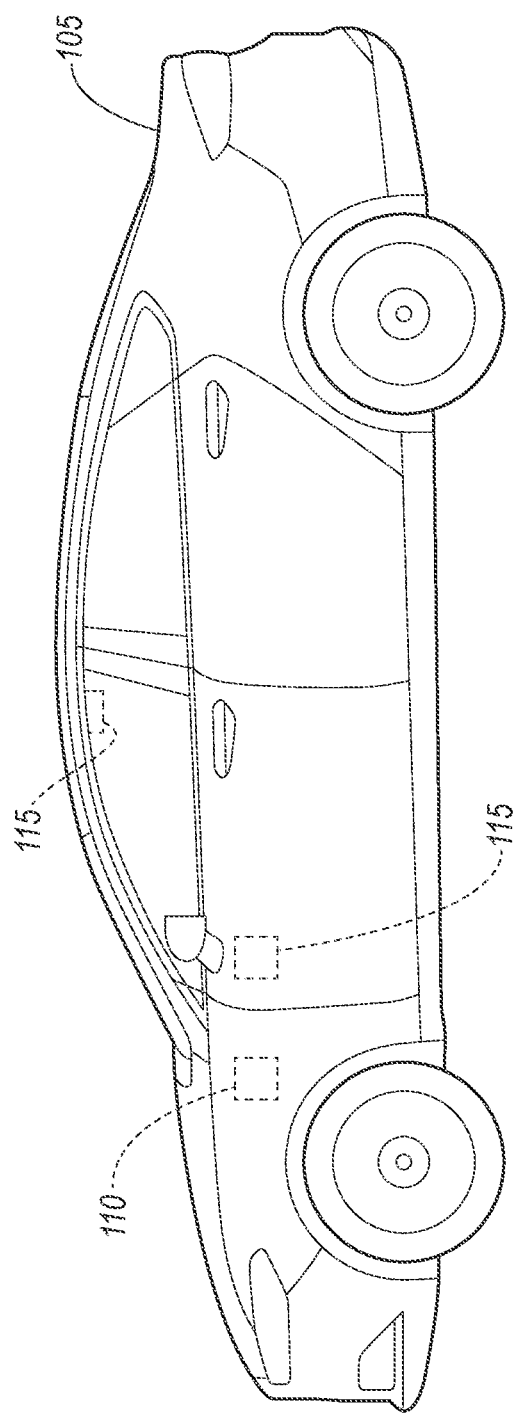
FIG. 2 is a view of an example vehicle.

FIG. 2 is a view of an example vehicle 105. The vehicle 105 includes one or more biometric sensors 115. The biometric sensors 115 collect biometric data of a user of the vehicle 105. In this context, "biometric" data are data of a biological feature of the user, e.g., a fingerprint, a facial image, audio voice data, etc. That is, the biometric sensors 115 can include, e.g., a fingerprint scanner disposed in a door handle, a camera disposed in a dashboard, a microphone disposed in a vehicle roof, etc. Each vehicle user has unique biometric data.

The computer 110 can include one or more sets of user-specific data. A "set of user-specific data" is a set of data with identification data keyed to a particular user, e.g., one or more geographic locations, settings for components, etc. Each set of user-specific can include security data keyed to the specific user. The "security data" are data the computer 110 uses to identify the specific user. The security data can include biometric data of the user, e.g., a facial image, a fingerprint, audio voice data, etc., a password, a personal identification number, etc. The computer 110 can, based on the security data, identify the user when the security data match stored security data in one of the sets of user-specific data. For example, the computer 110 can compare the biometric data of a fingerprint to the fingerprint data of each set of user-specific data with a conventional fingerprint-identifying algorithm. If the fingerprint-identifying algorithm determines that the received fingerprint matches one of the fingerprints in one of the sets of user-specific data, the computer 110 can identify the user that provided the fingerprint as the user associated with the set of user-specific data with the matched fingerprint.

Figure 3:
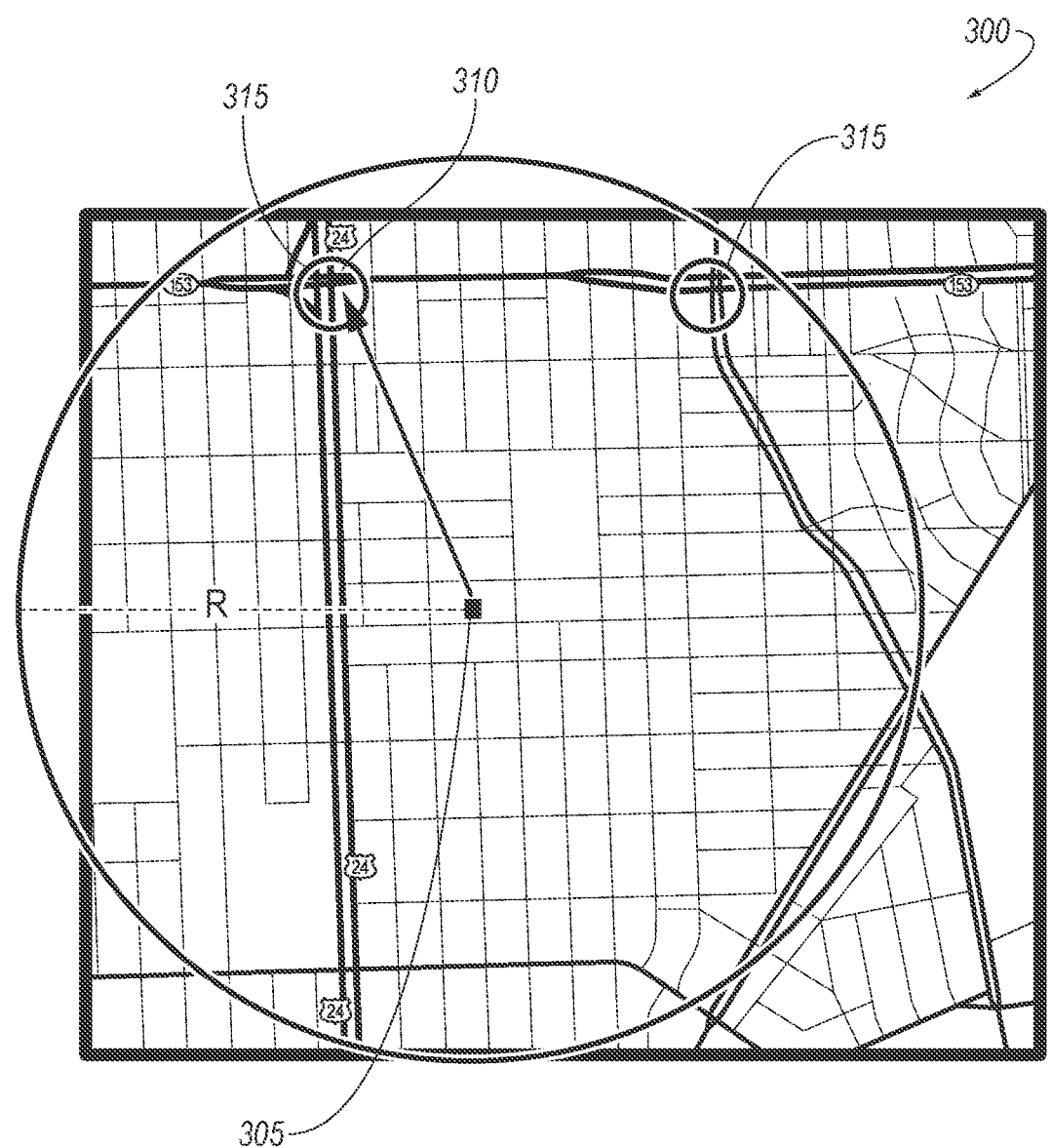
FIG. 3 is a view of a geographic area.

FIG. 3 is a view of an example geographic area 300 including a stored location 305. The "geographic area" can be a predetermined area specified according to geo-coordinates, e.g., a geo-fence used geo-coordinates to specify an area boundary, and the geo-coordinates can define an area of a municipality, an area sharing a common postal code, etc. The computer 110 stores the stored location 305 in a memory and/or can receive the stored location 305 from a server 130. The stored location 305 can be, e.g., a home address, a work address, a favored retail location, etc.

The user can request the stored location 305. As described above, when the biometric data of the user matches biometric data in one of the sets of user-specific data, the computer 110 can display the stored location 305 to the user. For example, the computer 110 can display the stored location 305 as an address and/or set of geo-coordinates via a human-machine interface (HMI) in the vehicle 105, e.g., a touchscreen display, a projected display on a windshield, etc. Alternatively or additionally, the computer 110 can display the stored location 305 as an address and/or set of geo-coordinates on a portable device of the user, e.g., a smartphone, a smartwatch, a tablet, etc. Yet alternatively or additionally, the computer 110 can actuate a speaker to provide an audio message including the stored location 305.

When the biometric data of the user does not match biometric data in one of the sets of user-specific data, the computer 110 can offset the stored location 305. To "offset" the stored location 305 is to provide a location different from the stored location 305, i.e., an "offset location" 310. The offset location 310 can be based on the stored location 305. The computer 110 can determine the offset location 310 as an intersection 315 of two or more roads within a distance threshold R of the stored location 305. An "intersection" is a location at which two or more roads cross. The distance threshold R can be a predetermined value determined by, e.g., a manufacturer, as described below. If there is only one intersection 315 within the distance threshold R, the computer 110 can identify that intersection 315 as the offset location 310.

If there is more than one intersection 315 within the distance threshold R, the computer 110 can identify the intersection 315 with a highest traffic capacity as the offset location 310. A "traffic capacity" is a measure of a rate of traffic flow through the intersection 315. The traffic capacity can include one or more traffic parameters, e.g., a number of roadway lanes at the intersection 315, a posted speed limit at the intersection 315, an average number of vehicles 105 traveling through the intersection 315 for a predetermined period of time, a direction of travel of the vehicle 105, etc. The computer 110 can determine the traffic capacity as a weighted average of the traffic parameters, each weight determined by, e.g., empirical and/or virtual testing of actual and/or virtual vehicles 105 in actual and/or virtual geographic areas with conventional traffic models. The computer 110 can determine the traffic capacity for each intersection 315 based on data collected from the server 130.

In the example of FIG. 3, the geographic area 300 is an "urban" area, i.e., a geographic area with a population density above a threshold. A "population density" is an amount of people per unit area for the area, e.g., 1000 people per square mile. The threshold can be determined based on, e.g., municipal census classifications. For example, one criterion that the United States Census Bureau uses to define an "urbanized area" is a population density of at least 1000 people per square mile. In another example, the geographic area 300 can be a "rural" geographic area, i.e., a geographic area with a population density below a second threshold. The second threshold can be, e.g., 100 people per square mile, and can be determined based on criteria from municipal census classifications. In another example, the geographic area 300 can be a "suburban" geographic area, i.e., a geographic area with a population density below the threshold and above the second threshold.

The distance threshold R can be based on the population density. For example, the distance threshold R can be a predetermined constant divided by the population density, i.e., increasing population density decreases the distance threshold R. The predetermined constant can be determined based on, e.g., empirical and/or virtual testing of vehicles 105 in actual and/or virtual geographic areas to identify intersections 315 that could be used as the offset location 310.

The computer 110 can identify the offset location 310 as the intersection 315 when the geographic area 300 is urban. In urban areas, intersections 315 can be more closely located to each other than in suburban or rural areas. That is, in a suburban or rural area, no intersections 315 may be located within the distance threshold R of the stored location 305. Thus, the computer 110 can determine that the geographic area 300 is urban and, then, identify the intersection 315 with the highest traffic capacity within the distance threshold R as the offset location 305.

Figure 4:
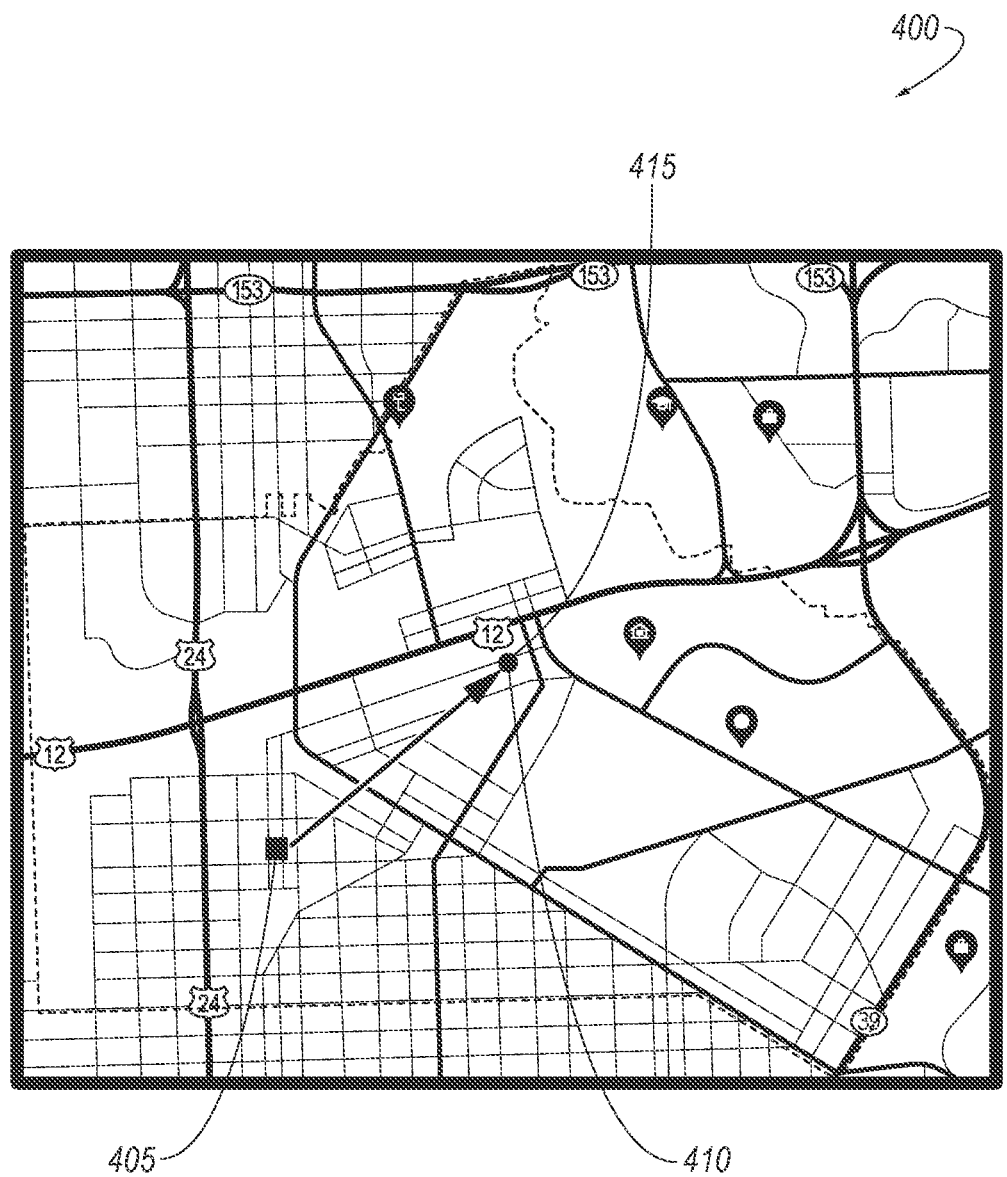
FIG. 4 is a view of another geographic area.

FIG. 4 is a view of another example geographic area 400 including a stored location 405. The computer 110 can determine the offset location 410 for the geographic area 400 based on the stored location 405. The computer 110 can determine a centroid 415 of the geographic area 400 as the offset location. The "centroid" of the geographic area is a set of geo-coordinates that is the arithmetic mean of all geo-coordinate points within the boundary of the geographic area 400. As described above, the geographic area 400 can be an area in which each location shares a common postal code. The computer 110 can determine the centroid 415 with a conventional centroid identification algorithm, e.g., a plumb line algorithm, geometric decomposition, etc. Alternatively, the computer 110 can determine the offset location 410 as a center point of a largest circle (not shown) inset in the geographic area 400.

In the example of FIG. 4, the geographic area 400 is a "suburban" geographic area. The computer 110 can determine the offset location 410 as the centroid 415 of the geographic area when the geographic area 400 is suburban. That is, the suburban geographic area lack intersections 315 within a distance threshold of the stored location 405, as described above, and the centroid 415 of the geographic area 400 can be determined prior to identifying the user and stored in the server 130 and/or the computer 110. That is, the centroid 415 can be stored in the set of user-specific data, and the computer 110 can use the centroid 415 from the set of user-specific data as the offset location 410, thus determining the offset location 410 without collecting traffic capacity data and/or communicating with the server 130.

Figure 5:
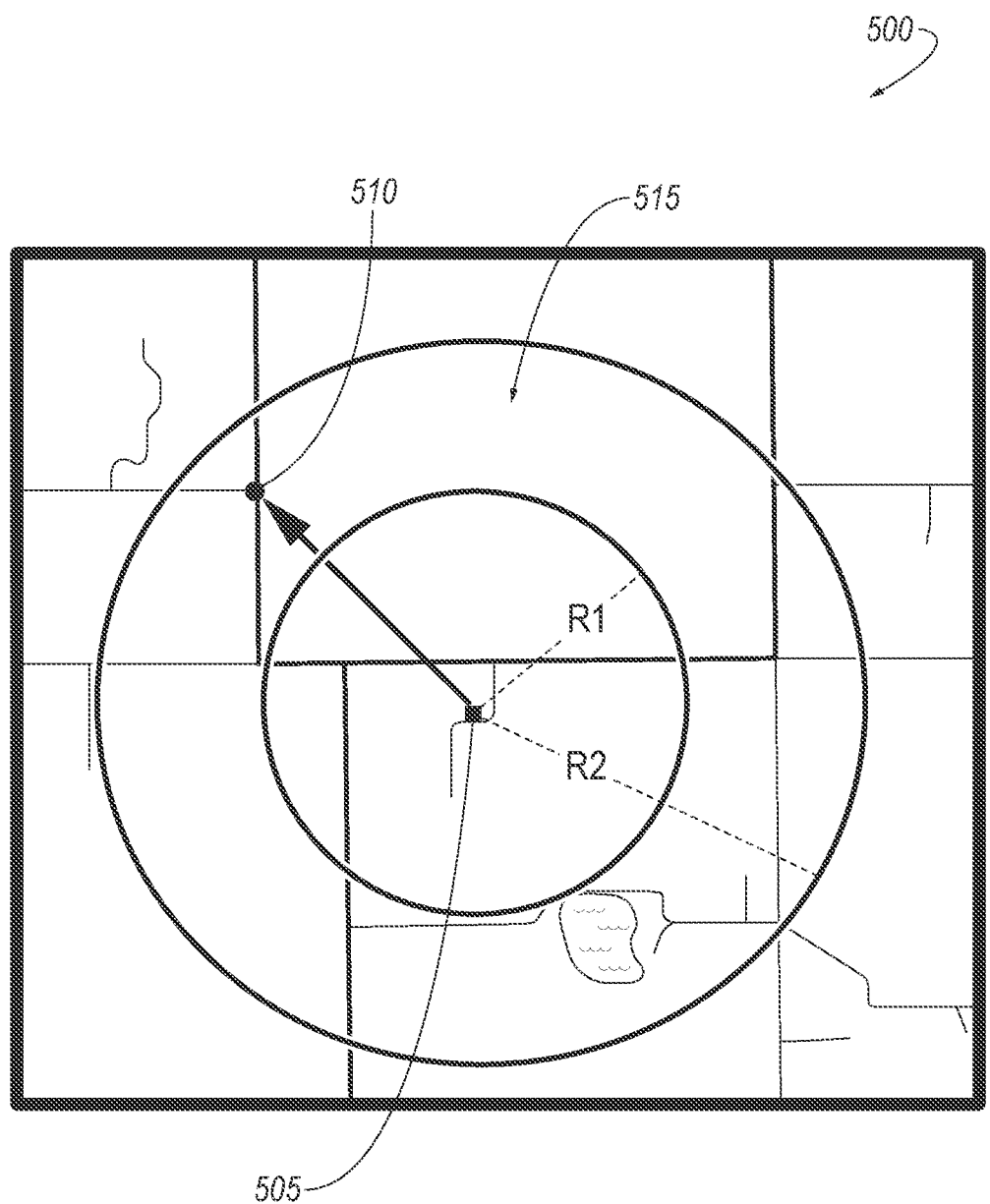
FIG. 5 is a view of another geographic area.

FIG. 5 is a view of another example geographic area 500 including a stored location 505. The computer 110 can determine an offset location 510 as a random location in the geographic area 500. The computer 110 can select a random location within a specified set of locations within the geographic area 500. That is, the geographic area 500 may include a plurality of locations from which the computer 110 can randomly select, which can cause typical pseudorandom number generation algorithms to process more slowly than a smaller specified set of locations.

The specified set of locations can be locations within an annulus 515 having an origin at the stored location 505. An "annulus" is a geometric shape defined as the area between two circles sharing a common origin and different radii. That is, the annulus 515 is a ring. The annulus 515 has a first radius R1 and a second radius R2. The first radius R1 is smaller than the second radius R2. Thus, the annulus 515 is the set of locations farther from the stored location 505 than the first radius R1 and closer to the stored location 505 than the second radius R2. The computer 110 can determine the radii R1, R2 based on posted speed limits in the geographic area 500 and a manufacturer recommended time range that the vehicle 105 would take from the offset location 510 to the stored location 505. For example, the time range can be 5-10 minutes, i.e., the radii R1, R2 are determined such that the vehicle 105, following the posted speed limits, would take between 5-10 minutes to move from the offset location 510 to the stored location 505. Alternatively or additionally, the computer 105 can determine the radii R1, R2 based on the population density of the geographic area 500. For example, the computer 105 can determine the second radius R2 as a distance from the stored location 505 to a location at which the rural geographic area 500 ends and a suburban or urban geographic area begins. That is, the computer 105 can determine the second radius R2 as a distance between the stored location 505 and a location at which the population density exceeds the second threshold, as described above.

The specified set of locations within the annulus 515 can be locations on roadways in the annulus 515. That is, rather than randomly selecting a random location from all locations within the annulus 515, the computer 110 can identify locations within the annulus 515 that are on roadways (e.g., from geo-location data from the server 130) and can randomly select one of the locations on the roadways as the offset location 510.

In the example of FIG. 5, the geographic area 500 is a "rural" geographic area, as described above. The computer 110 can determine the offset location 510 as a random location within the annulus 515 when the geographic area 500 is rural. That is, in a rural geographic area 500, there may not be an intersection of roadways within a distance radius of the stored location 505, and the area sharing a common postal code may be cause the offset location 510 to be selected farther away than the second radius R2. Thus, the computer 110 can identify the annulus 515 upon identifying the geographic area 500 as rural.

Figure 6:
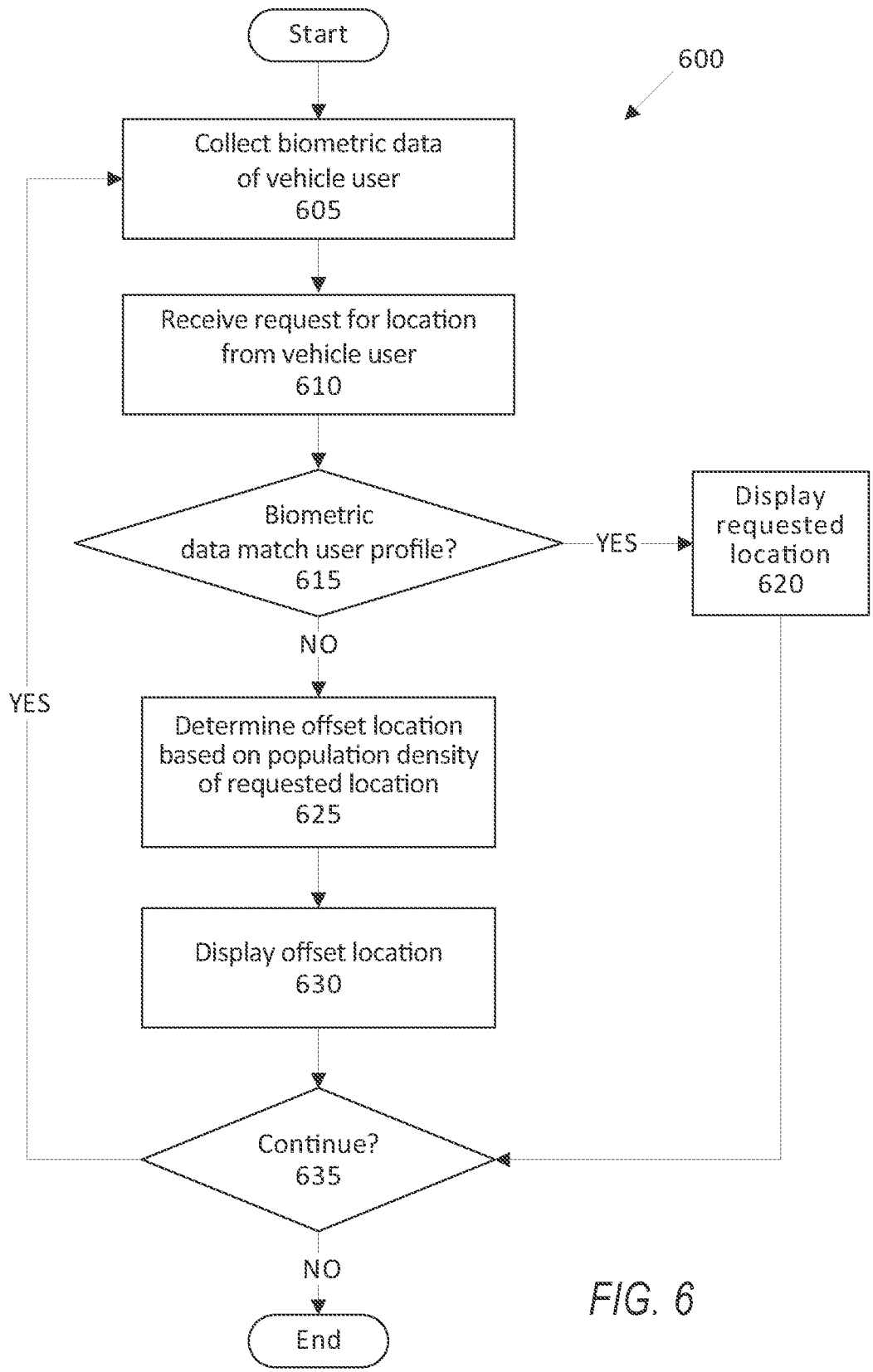
FIG. 6 is a diagram of an example process for operating the vehicle.

FIG. 6 is a diagram of an example process 600 for operating a vehicle 105. The process 600 begins in a block 605, in which a computer 110 in a vehicle 105 actuates one or more biometric sensors 115 to collect biometric data of a vehicle 105 user. The biometric sensors 115 can include, e.g., a microphone, a fingerprint scanner, a camera, etc. The biometric data can include, e.g., a fingerprint, a facial image, audio voice data, etc.

Next, in a block 610, the computer 110 receives a request for a stored location 305, 405, 505 from the vehicle 105 user. The computer 110 can store a plurality of locations 305, 405, 505, e.g., a home address, a work address, etc. The vehicle 105 user can request the stored location 305, 405, 505 by, e.g., providing input to a vehicle 105 human-machine interface (HMI) such as a touchscreen display.

Next, in a block 615, the computer 110 determines whether the collected biometric data match biometric data of a set of user-specific data stored in the computer 110. As described above, a set of user-specific data is a set of data associated with a particular user, e.g., one or more geographic locations, settings for components, biometric data of the user, etc. If the computer 110 determines that the collected biometric data match biometric data of a set of user-specific data stored in the computer 110, the process 600 continues in a block 620. Otherwise, the process 600 continues in a block 625.

In the block 620, the computer 110 displays the stored location 305, 405, 505. The computer 110 can display the stored location 305, 405, 505 via the HMI. Alternatively or additionally, the computer 110 can display the stored location 305, 405, 505 on a portable device of the user.

In the block 625, the computer 110 determines an offset location 310, 410, 510 based on a population density of the geographic area 300, 400, 500 that includes the requested stored location 305, 405, 505. As described above, the computer 110 can determine the offset location 310 as an intersection 315 of two roads within a distance threshold R of the stored location 305 when the population density of the geographic area 300 exceeds a first threshold. In another example, the computer 110 can determine the offset location 410 as a centroid 415 of a geographic area 400 in which the requested stored location 405 is located when the population density is below the first threshold and above a second threshold. In another example, the computer 110 can determine the offset location 510 as a random location in an annulus 515 centered at the stored location 505 when the population density of a geographic area 500 is below the second threshold.

Next, in a block 630, the computer 110 displays the offset location 310, 410, 510. The computer 110 can display the offset location 310, 410, 510 as an address and/or set of geo-coordinates via the HMI. Alternatively or additionally, the computer 110 can display the offset location 310, 410, 510 as an address and/or set of geo-coordinates on a portable device of the user. Yet alternatively or additionally, the computer 110 can actuate a speaker to provide the offset location 310, 410, 510 as an audio message including an address and/or set of geo-coordinates.

Next, in a block 635, the computer 110 determines whether to continue the process 600. For example, the computer 110 can determine to continue the process 600 when another vehicle 105 user approaches the vehicle 105. In another example, the computer 110 can determine not to continue the process 600 when the vehicle 105 is powered off. if the computer 110 determines to continue, the process 600 returns to the block 605. Otherwise, the process 600 ends.

Computing devices discussed herein, including the computer 110, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 110 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 600, one or more of the steps could be omitted, or the steps could be executed in a different order than shown in FIG. 6. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

The invention claimed is:

1. A system, comprising a computer including a processor and a memory, the memory storing instructions executable by the processor to:
identify a set of user-specific data from one or more stored sets of user-specific data based on identifying a user;
receive a request for a stored location; and
based on identifying the user, identify an offset location based on the requested stored location not being associated with the identified set of user-specific data, and on a population density of the requested location, and display the offset location.

2. The system of claim 1, wherein the instructions to identify the offset location include instructions to identify an intersection of two or more roads within a distance threshold of the requested location as the offset location.

3. The system of claim 2, wherein the instructions further include instructions to identify a plurality of intersections within the distance threshold of the requested location, to identify a traffic capacity of each of the plurality of intersections, and to identify a one of the plurality of intersections having a highest traffic capacity as the offset location, wherein the traffic capacity includes at least one of a number of roadway lane at the intersection, a posted speed limit at the intersection, or an average number of vehicles traveling through the intersection for a predetermined period of time.

4. The system of claim 2, wherein the instructions further include instructions to identify the intersection when the population density is above a first threshold.

5. The system of claim 1, wherein the instructions to identify the offset location include instructions to identify first and second radii from the requested location, to identify an annulus defined by the first and second radii having an origin at the requested location, and to randomly select a location within the annulus as the offset location.

6. The system of claim 5, wherein the instructions further include instructions to identify a plurality of locations within the annulus that are on a roadway and to randomly select one of the plurality of locations as the offset location.

7. The system of claim 5, wherein the instructions further include instructions to identify the first and second radii when the population density is below a second threshold.

8. The system of claim 1, wherein the instructions to identify the offset location include instructions to identify a specified geographical area in which the requested location is located and to identify a centroid of the specified geographical area as the offset location.

9. The system of claim 8, wherein the specified geographical area is a geographical area defined by a common postal code.

10. The system of claim 8, wherein the instructions further include instructions to identify the specified geographical area when the population density is below a first threshold and above a second threshold.

11. The system of claim 1, wherein instructions further include instructions to identify the user based on biometric data collected with one of a fingerprint scanner, a camera, or a microphone.

12. The system of claim 11, wherein the biometric data include at least one of a fingerprint, facial image data, or voice data.

13. A method, comprising:
identifying a set of user-specific data from one or more stored sets of user-specific data based on identifying a user;
receiving a request for a stored location; and
based on identifying the user, identifying an offset location based on the requested stored location not being associated with the identified set of user-specific data, and on a population density of the requested location, and displaying the offset location.

14. The method of claim 13, further comprising identifying an intersection of two or more roads within a distance threshold of the requested location as the offset location.

15. The method of claim 14, further comprising identifying a plurality of intersections within the distance threshold of the requested location, identifying a traffic capacity of each of the plurality of intersections, and identifying a one of the plurality of intersections having a highest traffic capacity as the offset location, wherein the traffic capacity includes at least one of a number of roadway lane at the intersection, a posted speed limit at the intersection, or an average number of vehicles traveling through the intersection for a predetermined period of time.

16. The method of claim 13, further comprising identifying first and second radii from the requested location, identifying an annulus defined by the first and second radii having an origin at the requested location, and randomly selecting a location within the annulus as the offset location.

17. The method of claim 16, further comprising identifying a plurality of locations within the annulus that are on a roadway and randomly selecting one of the plurality of locations as the offset location.

18. The method of claim 13, further comprising identifying a specified geographical area in which the requested location is located and identifying a centroid of the specified geographical area as the offset location.

19. The method of claim 18, wherein the specified geographical area is a geographical area defined by a common postal code.

20. The method of claim 13, further comprising identifying the user based on biometric data collected with one of a fingerprint scanner, a camera, or a microphone.

* * * * *